L. H. DYER.
AUTOMOBILE VEHICLE.
APPLICATION FILED FEB. 3, 1900. RENEWED SEPT. 22, 1908.
921,963.
Patented May 18, 1909.
3 SHEETS—SHEET 1.
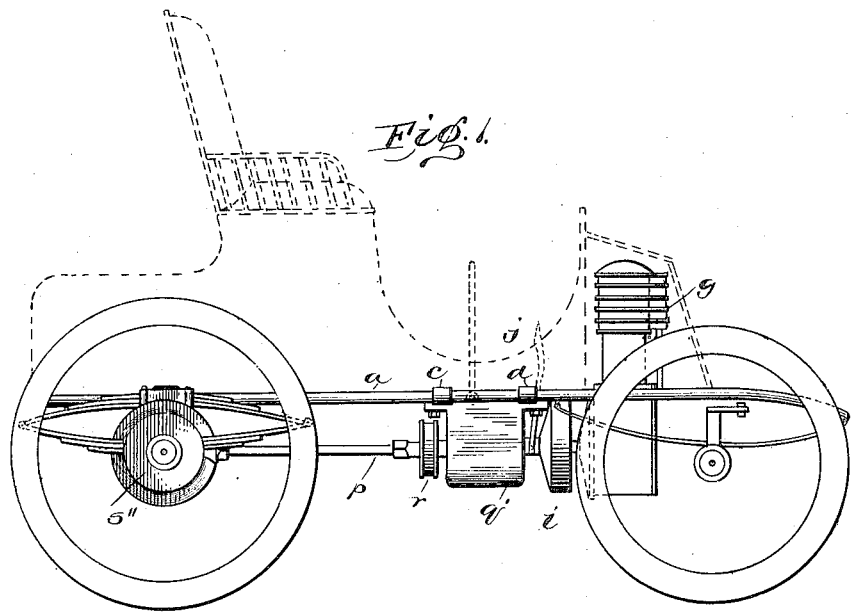
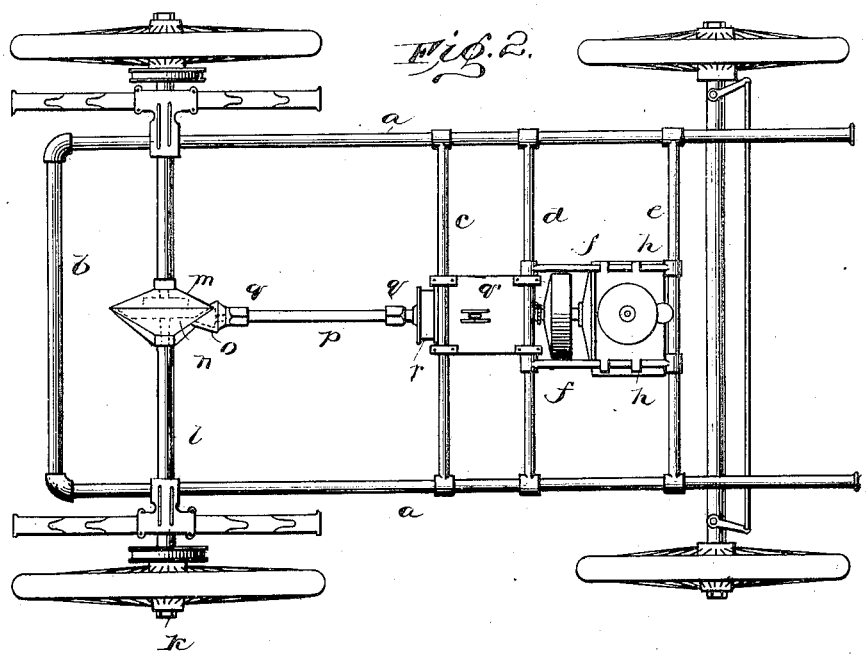
Witnesses:
J. M. Fowler Jr.
M. A. McLeod
Inventor
Leonard Huntress Dyer L. H. DYER.
AUTOMOBILE VEHICLE.
APPLICATION FILED FEB. 3, 1900. RENEWED SEPT. 22, 1908.
921,963.
Patented May 18, 1909.
3 SHEETS—SHEET 2.
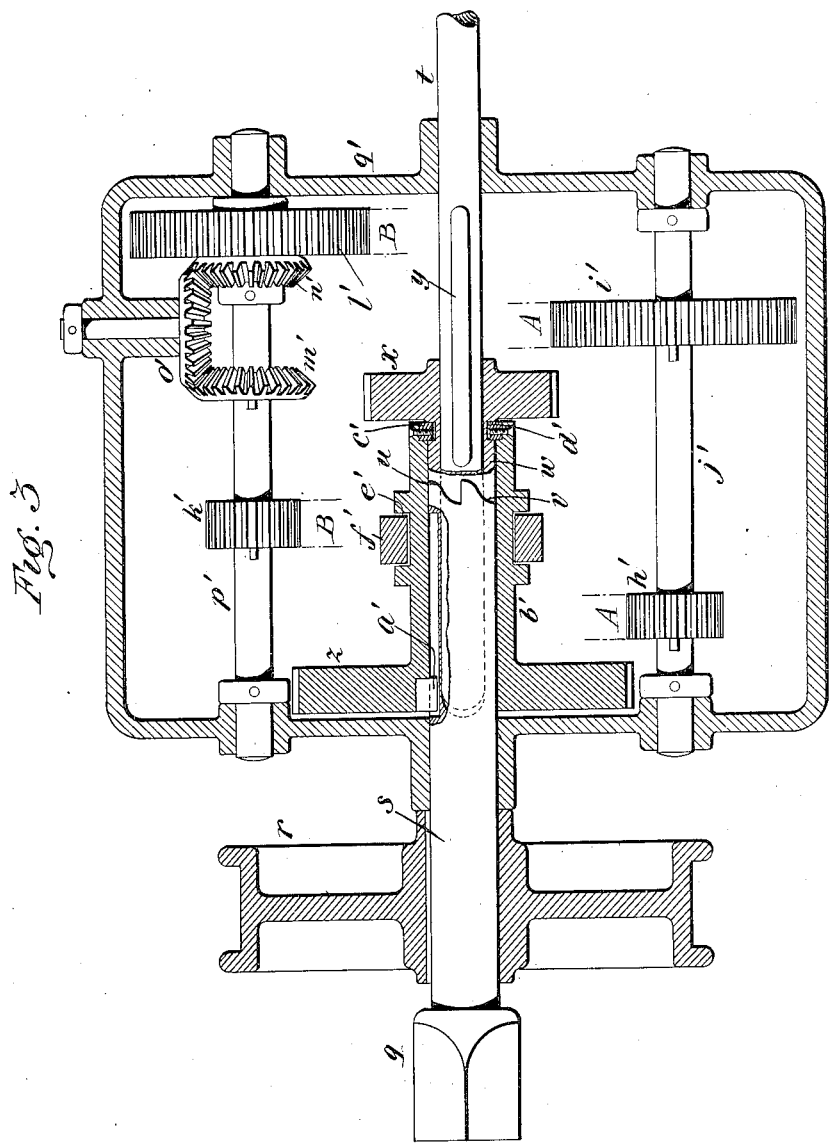

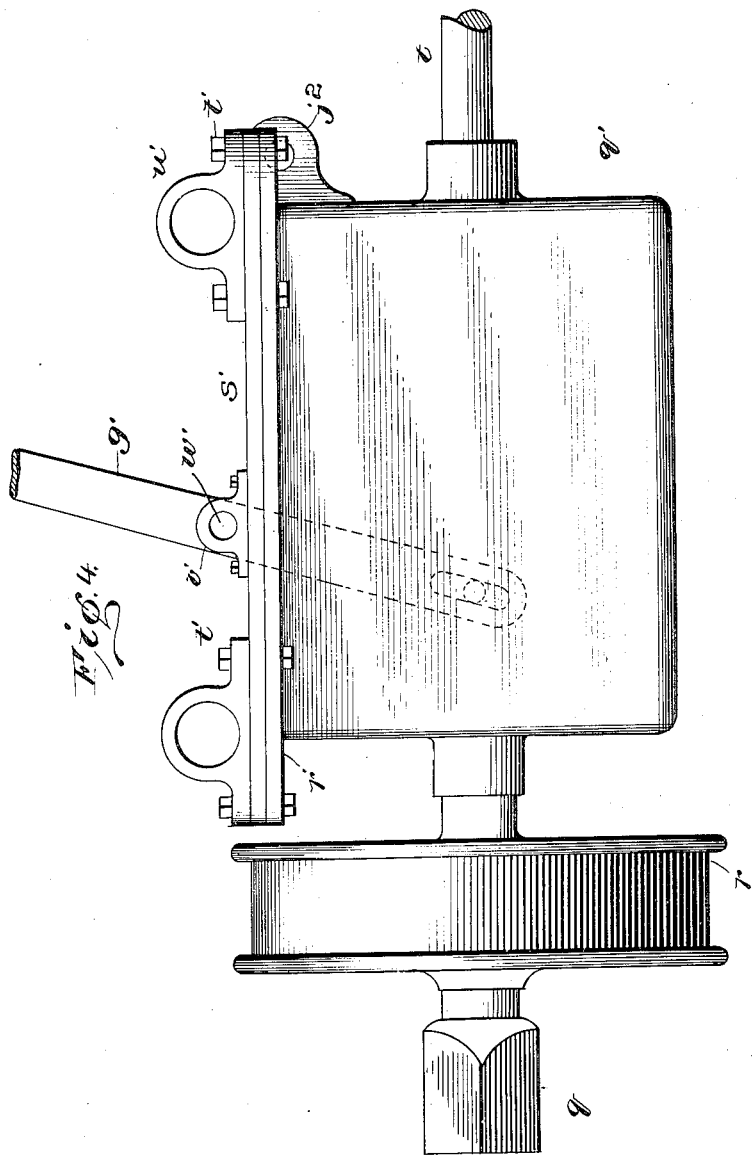

UNITED STATES PATENT OFFICE.

LEONARD HUNTRESS DYER, OF WASHINGTON, DISTRICT OF COLUMBIA, ASSIGNOR TO ENTERPRIZE AUTOMOBILE COMPANY, OF HASBROUCK HEIGHTS, NEW JERSEY, A CORPORATION OF NEW JERSEY.

AUTOMOBILE VEHICLE.

No. 921,963.     Specification of Letters Patent.     Patented May 18, 1909.

Application filed February 3, 1900, Serial No. 3,880.   Renewed September 22, 1908. Serial No. 454,155.

*To all whom it may concern:*

Be it known that I, LEONARD HUNTRESS DYER, a citizen of the United States, residing in Washington, in the District of Columbia, have invented certain new and useful Improvements in Automobile Vehicles; and I do hereby declare the following to be a full, clear, and exact description of the invention, which will enable others skilled in the art to which it appertains to make and use the same.

My present invention relates to automobile vehicles wherein an engine of the explosive or internal combustion type is used.

The objects of my invention consist in improvements in the frame of the vehicle, in the driving gear therefor and in the speed changing and reversing mechanism.

The invention comprises direct driving connections between the motor and the differential, with such reduction as is necessary owing to the relatively different speeds of such parts. In connection with this direct driving mechanism is provided an additional low speed gearing, and if necessary, a back or reverse gearing, either of which will be introduced when required.

The invention also comprises in a rectangular metal framework, supported by means of springs upon wheels with a driving motor carried thereon. Preferably the driving motor is mounted at the forward end of the frame and connects by means of a longitudinal shaft through the intermediary of bevel gears to a differential which is preferably, but not necessarily, mounted directly upon the rear axle. Connection is made between the driving engine and the longitudinal shaft by means of the usual friction clutch and the shaft may be provided, if necessary, with one or more flexible or knuckle joints to permit the framework to oscillate independently of the wheels and yet allow the driving mechanism to run freely.

To provide a speed changing gear, the longitudinal shaft is formed in two parts with a releasable connection between them combined with means for rotating the two shaft parts at different speeds. The invention is broad enough to permit of any form of mechanism being used for this purpose, but I prefer to use an auxiliary shaft, so mounted as to be parallel with the two parts of the main shaft, with a system of spur gearing which is normally not in mesh, but which can be intermeshed after the two shaft parts have been separated. Combined with the speed reducing gear is a reversing gear, which may be of any type, but I prefer to use a novel form which consists of a series of gears mounted upon another auxiliary shaft with bevel gearing so arranged that the two parts of the longitudinal shaft may be caused to rotate in opposite directions.

The various gears with their supporting shafts and the device for directly connecting the two shafts together are preferably mounted within a metallic box or case to exclude dust and reduce noise.

In order to better understand the nature of the invention, attention is called to the accompanying drawings forming part of this specification, and in which—

Figure 1 is a side view of an automobile vehicle embodying my invention, the body portion being shown in broken lines; Fig. 2 is a top view of the same; Fig. 3 is an enlarged view, partly in section, of the speed reducing gear and reverse gear; and Fig. 4 is a side view of the gear case.

In all the several views, like parts are designated by the same letters of reference.

Referring to Figs. 1 and 2, one form of frame is shown which consists of two parallel side members $a, a$, which are bent or curved down at their forward extremities to connect with the two front forward springs, and are connected together by means of the cross members $b, c, d$ and $e$. With these are combined the short lateral members $f, f$, to which is secured the motor $g$ by means of clips $h$, as shown. The motor $g$ is an explosive engine of the internal combustion type, and is illustrated as of vertical form, but the invention is not limited to the form or details of the engine. The motor shaft is arranged to lie in a longitudinal direction, that is to say, at right angles to the supporting axles. The fly-wheel of the engine is shown as combined with the clutch $i$ with a foot lever $j$ for disengaging the two parts of the clutch, a spring being used to keep them normally in engagement, as is well known in the art. As the construction of the clutch is not a part of this invention, it will not be described, it being understood that any well known form of clutch may be employed and is not necessarily attached to the fly wheel.

As shown in the drawings, the rear axle $k$ is mounted within the bridge $l$ and is cut or broken adjacent to the center thereof. The differential $m$ connects with and supports the bevel gear wheel $n$, which engages in the bevel pinion $o$, all shown in broken lines in Fig. 2. The differential and bevel gears are suitably incased, as shown. It is, of course, understood that the differential $m$ may be placed upon a counter shaft, which will be supported by bearings on the frame in the well known manner and motion will be transmitted from the counter shaft to the rear wheels in the usual way.

The longitudinal shaft $p$ is provided with knuckle or universal joints $q$ thereon to allow it to run freely irrespective of the relative positions of the carriage-body and the bridge $l$. The shaft $p$ connects the differential to the motor shaft through the agency of the clutch and together with the motor shaft and clutch serves as a driving means between the motor and the axle, or the counter shaft if used. A drum $r$ is provided for a band brake to engage with, and additional drums $s''$ may be arranged upon the hubs or naves of the rear wheels for auxiliary or emergency brakes.

The operation of so much of the invention as has been described is as follows: The friction clutch $i$ being disengaged, as for instance by means of the lever $j$ the motor can be started and allowed to run freely without it moving the vehicle. To start the vehicle the clutch is gradually applied whereby motion is transmitted by means of the longitudinal shaft $p$ through the knuckle joints to the bevel pinions $o$, and from there to the large bevel gear $n$ to the differential, thence to the rear axle and rear wheels. The shaft of the motor $g$ is preferably upon the same horizontal plane as the rear axle $k$. The shaft is also arranged within the center line of the vehicle. The vibration and the oscillation of the carriage-body and frame will, therefore, affect the free rotation of the shaft but little. The driving means which comprises the motor shaft, the clutch and the shaft $p$, the two shafts extending along in a straight line as illustrated, will be practically the same as a single shaft, and will not be deflected except by vibrations or oscillations of the springs and body. If desired, the shafts may not extend along the straight line shown, but such a construction I do not prefer. Any deflections which may appear will be remedied by the knuckle joints, and there being but one pair of gears, and these being incased, the noise of the machinery will be reduced to a minimum.

In Figs. 3 and 4 are shown the low speed and reversing gear. For the purpose of introducing this gear the longitudinal shaft $p$ is divided into two parts to form separate shafts $s$ and $t$, the part $t$ telescoping within the part $s$ and turning freely therein. The two shaft parts are caused to rotate together by means of suitable locking mechanism, as a jaw clutch, one member $u$ being formed integrally with the shaft $s$, while the other part consists of jaws $v$ formed upon a moving member $w$. The member $w$ is integrally formed with a pinion $x$ and the two are supported upon the shaft $p$ and turn therewith by means of a feather $y$. On the shaft $s$ is mounted a gear $z$ which turns therewith and may be slid along it by means of a feather $a'$ or any other suitable arrangement. The sleeve $b'$ to which the gear $z$ is attached surrounds the shaft $s$ and also the moving member $w$ of the jaw clutch, a ring or finger $c'$ engaging with the depression of groove $d'$ in the latter. A groove $e'$ is formed in the sleeve $b'$ for the support of the ring $f'$ which engages with and is actuated by a lever $g'$ (see Fig. 4). The latter is used for shifting the sleeve $b'$ along the shaft $s$, and with it, the gear $z$, together with the movable member of the jaw clutch $w$ and the pinion $x$, the two latter parts moving by the engagement of the ring $c'$ with the groove $d'$. When moved to the position shown in the dotted lines in Figs. 3 at "A" the gear $z$ and the pinion $x$ will engage with the pinion $h'$ and gear $i'$ respectively, which are both supported upon and keyed to a short auxiliary shaft $j'$ mounted in bearings so as to be parallel with the shafts $s$ and $t$. When the gear $z$ and pinion $x$ are in the position "A", the jaw clutch $u$ will be disengaged and the shafts $t$ and $s$ forming parts of the shaft $p$ will be caused to rotate at different rates of speed. Such will be the case if the gears are proportioned as shown in the drawings.

To provide a reversing gear, the additional gear $l'$ and pinion $k'$ are located in the position "B". This gear and pinion are supported upon a shaft $p'$ and the pinion $k'$ is keyed thereto. The gear $l'$ is free to turn upon the shaft $p'$, and is connected to, or is joined integrally with a bevel or miter gear $n'$, which intermeshes with a bevel gear $o'$, supported upon a short shaft mounted in fixed bearings on the case $q'$. A third bevel gear $m'$ is keyed to the shaft $p'$ and intermeshes with the bevel gear $o'$.

The shafts $s$, $t$, $j'$ and $p'$ are supported in bearings which are preferably formed integrally with a gear box $q'$. The latter is provided with a flange $r'$ at the top and a cover $s'$, the two being secured together by means of bolts $t'$. The entire gear case is supported upon the cross members $c$ and $d$ of the vehicle frame by means of the clips $u'$ which are secured to the corners of the cover $s'$ by means of the same bolts $t'$ which secure the top to the case. A pair of lugs or ears $v'$ provide a bearing for the pin $w'$ upon which is mounted the shifting lever $g'$.

The operation of the low speed and reversing gear is as follows: While running at the normal rate of speed the parts are in the position shown in Fig. 3, the two shafts $s$ and $t$ forming the shaft $p$ being for all practical purposes one single shaft. The gears $x$ and $z$ being out of the mesh with the secondary gears, they and the auxiliary shaft are at rest. To change gear the friction clutch $i$ is first disengaged, and the gears $x$ and $z$, together with the movable member of the jaw clutch are moved to the position "A" by means of the lever $q'$. The friction clutch $j$ is then reëngaged. Power will now be transmitted from the forward shaft $t$ to the rear shaft $s$ by means of the pinion $x$ in engaging with the gear $i'$, and the latter revolving the pinion $h'$ which is in engagement with the gear $z$ will rotate the rear shaft $s$ at a lower rate of speed, but in the same direction.

To reverse, the carriage is first brought to a state of rest, and upon the clutch $j$ being disengaged the gears $x$ and $z$ are brought to the position "B". The friction clutch being reëngaged, motion will be imparted from the front shaft $t$ to the rear shaft $s$ through the pinion $x$ gear $l'$, miter gears $m'$, $n'$ and $o'$, shaft $p'$, and pinion $k'$ and gear $z$. The gear $k'$ and shaft $p'$ will rotate in the opposite direction from the gear $l'$ and consequently the shaft $s$ will rotate in an opposite direction from the shaft $t$ and will cause the vehicle to travel backward Additional low speed gears can be arranged by the addition of auxiliary shafts and secondary gears.

The gearing disclosed herein is not claimed in this application, but forms the subject matter of an application for patent filed by me on the 22nd day of January, 1906, Serial No. 297,116.

Having now particularly described and ascertained the nature of my invention, what I claim as new therein and desire to secure by Letters Patent is:—

1. The combination in a vehicle of a spring supported frame, driving and steering wheels, a motor mounted upon the front of the frame, a shaft driven by such motor and in line with the shaft of the motor, the said shaft being longitudinally arranged substantially at an equal distance between the wheels and substantially parallel with the ground, a friction clutch connecting the shaft to the motor, a second shaft in line with the first shaft, means for directly connecting the two shafts for driving the second shaft without reduction in speed, means for breaking the connection between the two shafts and for connecting them together through power transmitting mechanism, affording a reduced speed, a differential gear between the second shaft and the wheels of the vehicle, and a reversing gear for reversing the direction of travel of the vehicle.

2. The combination in a vehicle, of a spring supported frame, driving and steering wheels, a motor mounted upon the front of the frame, a shaft driven by such motor and in line with the shaft of such motor, the said shaft being longitudinally arranged between the wheels, a friction clutch connecting the shaft to the motor, a second shaft in line with the first shaft, means for directly connecting the two shafts for driving the second shaft without reduction in speed, and means for breaking the connection between the two shafts and for connecting them together through power transmitting mechanism, affording a reduced speed.

3. The combination in a vehicle, of a spring supported frame, driving and steering wheels, a motor mounted upon the front of the frame, a shaft driven by such motor, and in line with the shaft of the motor, the said shaft being longitudinally arranged between the wheels, a friction clutch connecting the shaft to the motor, a second shaft in line with the first shaft, means for directly connecting the two shafts for driving the second shaft without reduction in speed, means for breaking the connection between the two shafts, and for connecting them together through power transmitting mechanism, affording a reduced speed, and a reversing gear for reversing the direction of travel of the vehicle.

This specification signed and witnessed this 3rd day of February 1900.

LEONARD HUNTRESS DYER.

Witnesses:
 ALEXANDER J. STEWART,
 M. A. McLEOD.